United States Patent
Mestery et al.

(10) Patent No.: US 11,153,261 B2
(45) Date of Patent: Oct. 19, 2021

(54) ROUTING TRAFFIC FOR VIRTUALIZED/CONTAINERIZED NETWORK FUNCTIONS

(71) Applicant: Cisco Technology, Inc., San Jose, CA (US)

(72) Inventors: Kyle Andrew Donald Mestery, Woodbury, MN (US); Grzegorz Boguslaw Duraj, Vancouver (CA)

(73) Assignee: Cisco Technology, Inc., San Jose, CA (US)

(*) Notice: Subject to any disclaimer, the term of this patent is extended or adjusted under 35 U.S.C. 154(b) by 51 days.

(21) Appl. No.: 16/749,621

(22) Filed: Jan. 22, 2020

(65) Prior Publication Data
US 2021/0226911 A1 Jul. 22, 2021

(51) Int. Cl.
*H04L 12/24* (2006.01)
*H04L 12/46* (2006.01)
*H04L 29/12* (2006.01)
*H04L 29/06* (2006.01)

(52) U.S. Cl.
CPC ........ *H04L 61/103* (2013.01); *H04L 41/0893* (2013.01); *H04L 61/6022* (2013.01); *H04L 69/22* (2013.01)

(58) Field of Classification Search
CPC .............. H04L 41/0893; H04L 61/103; H04L 61/6022; H04L 69/22
See application file for complete search history.

(56) References Cited

U.S. PATENT DOCUMENTS

| | | | | |
|---|---|---|---|---|
| 7,046,666 B1 * | 5/2006 | Bollay | ............. | H04L 29/12009 370/392 |
| 8,370,834 B2 * | 2/2013 | Edwards | ................ | G06F 9/546 718/1 |
| 9,183,028 B1 * | 11/2015 | Brandwine | ......... | H04L 67/2823 |
| 9,215,175 B2 * | 12/2015 | Takashima | ............. | H04L 47/12 |
| 9,325,615 B2 * | 4/2016 | Wu | ......................... | H04L 41/12 |
| 9,477,506 B2 * | 10/2016 | Wang | ................. | G06F 9/45558 |
| 9,661,064 B2 | 5/2017 | Kranz et al. | | |
| 9,825,822 B1 * | 11/2017 | Holland | ............. | H04L 41/5096 |

(Continued)

OTHER PUBLICATIONS

Chiara Contoli, "Virtualized Network Infrastructures: Performance Analysis, Design and Implementation". amsdottorato.unibo.it, 2017, 121 pages.

(Continued)

*Primary Examiner* — Alpus Hsu
(74) *Attorney, Agent, or Firm* — Lee & Hayes, P.C.

(57) ABSTRACT

A VM receives a first ARP request from a first instance of a virtualized network function (VNF) associated with a first MAC address. The VM may determine the first MAC address and, based at least in part on the first MAC address, may a second MAC address with which to respond to the first ARP request. The VM may then send, to the first instance of the VNF, a response to the first ARP request specifying the second MAC address. The VM may also receive a second ARP request from a second instance of the VNF associated with a third MAC address. The VM may determine a fourth MAC address with which to respond to the second ARP request, and may thereafter send a response to the second ARP request to the second instance of the VNF, with the response specifying the fourth MAC address.

14 Claims, 9 Drawing Sheets

(56) References Cited

U.S. PATENT DOCUMENTS

| | | | |
|---|---|---|---|
| 10,205,698 B1* | 2/2019 | Petersen | H04L 61/103 |
| 10,326,532 B2 | 6/2019 | Ashrafi | |
| 10,469,317 B1 | 11/2019 | Jiang et al. | |
| 10,749,798 B2* | 8/2020 | Hazay | H04L 63/30 |
| 2002/0062450 A1* | 5/2002 | Carlson | H04L 63/10 |
| | | | 726/26 |
| 2010/0095020 A1* | 4/2010 | Rixner | H04L 29/12028 |
| | | | 709/233 |
| 2015/0124817 A1* | 5/2015 | Merchant | H04L 45/74 |
| | | | 370/392 |
| 2015/0304450 A1* | 10/2015 | van Bemmel | H04L 12/4641 |
| | | | 709/217 |
| 2016/0072705 A1* | 3/2016 | Lee | H04L 61/6022 |
| | | | 370/392 |
| 2016/0337236 A1* | 11/2016 | Hsu | H04L 29/12028 |
| 2017/0149729 A1* | 5/2017 | Tsirkin | H04L 61/6022 |
| 2017/0279713 A1* | 9/2017 | Liu | H04L 61/103 |
| 2017/0310734 A1* | 10/2017 | Shin | H04L 61/103 |
| 2017/0353572 A1* | 12/2017 | Wang | H04L 29/06 |
| 2018/0013611 A1* | 1/2018 | Nainar | H04L 61/6022 |
| 2018/0013674 A1* | 1/2018 | Nainar | H04L 45/32 |
| 2018/0210750 A1* | 7/2018 | Cui | G06F 9/45558 |
| 2018/0332105 A1* | 11/2018 | Huang | H04L 67/1038 |
| 2019/0158396 A1* | 5/2019 | Yu | H04L 12/4641 |
| 2019/0190885 A1* | 6/2019 | Krug | H04L 61/2517 |
| 2020/0076685 A1* | 3/2020 | Vaidya | G06F 9/45558 |
| 2020/0220814 A1* | 7/2020 | Hazay | H04L 12/4641 |

OTHER PUBLICATIONS

"Contrail Architecture", retrieved from juniper.net, Sep. 2015, 44 pages.

\* cited by examiner

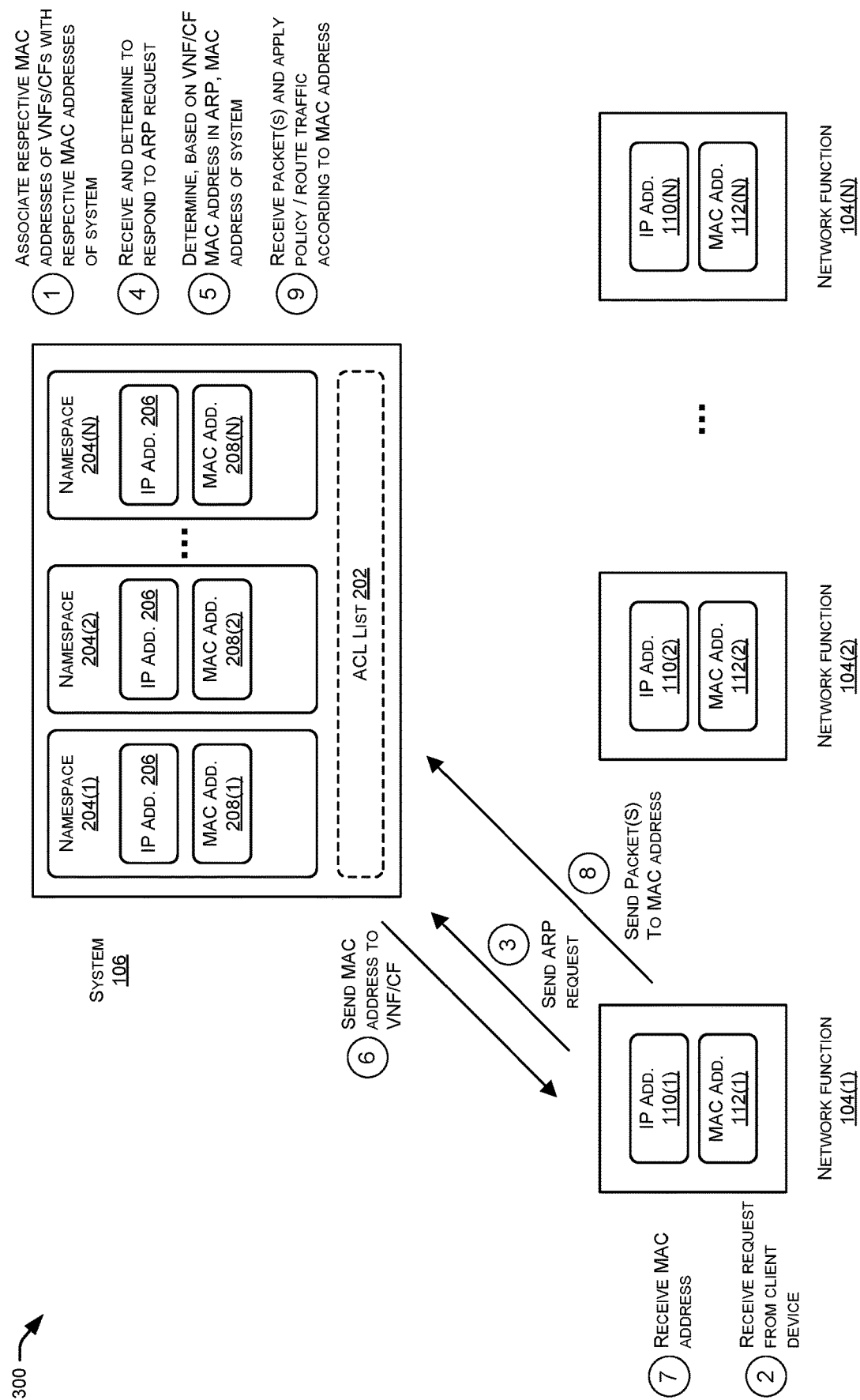

ROUTING TRAFFIC FOR VIRTUALIZED/CONTAINERIZED NETWORK FUNCTIONS

TECHNICAL FIELD

The present disclosure relates generally to techniques enabling legacy applications to run as virtualized network functions (VNFs) or containerized network functions (CNFs) with minimal changes to the underlying legacy applications.

BACKGROUND

In today's world of network function virtualization (NFV), application providers often provide their images in a format that comes from the physical world. That is, each image is generally the same image that runs on a piece of hardware, having only been modified to run as a virtual machine and enabled via an orchestration platform. However, this results in requirements similar to what the application would require when running on hardware, such as specific interfaces, ordering, and the like. In addition, if an underlying application was written for a single tenant, it may prove difficult to make the application work for multiple tenants.

Similarly, even an application that was made to run on a host or inside a virtual machine can be configured to run in a container. However, similar to the use case discussed above, the requirements from the traditional configuration may remain when running inside a container environment. Thus, running a legacy application in a more dynamic environment proves challenging. However, solving these changes may allow application providers the ability to leverage their existing code and run it on a modern scheduling environment.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 3 illustrates an example flow of operations for receiving an ARP request from a first instance of the illustrated network function, determining a MAC address of the system previously associated with this instance, returning an indication of this MAC address to the instance of the network function, and subsequent routing traffic and/or applying policy to packets sent to this MAC address.

DESCRIPTION OF EXAMPLE EMBODIMENTS

Overview

Figure 1:
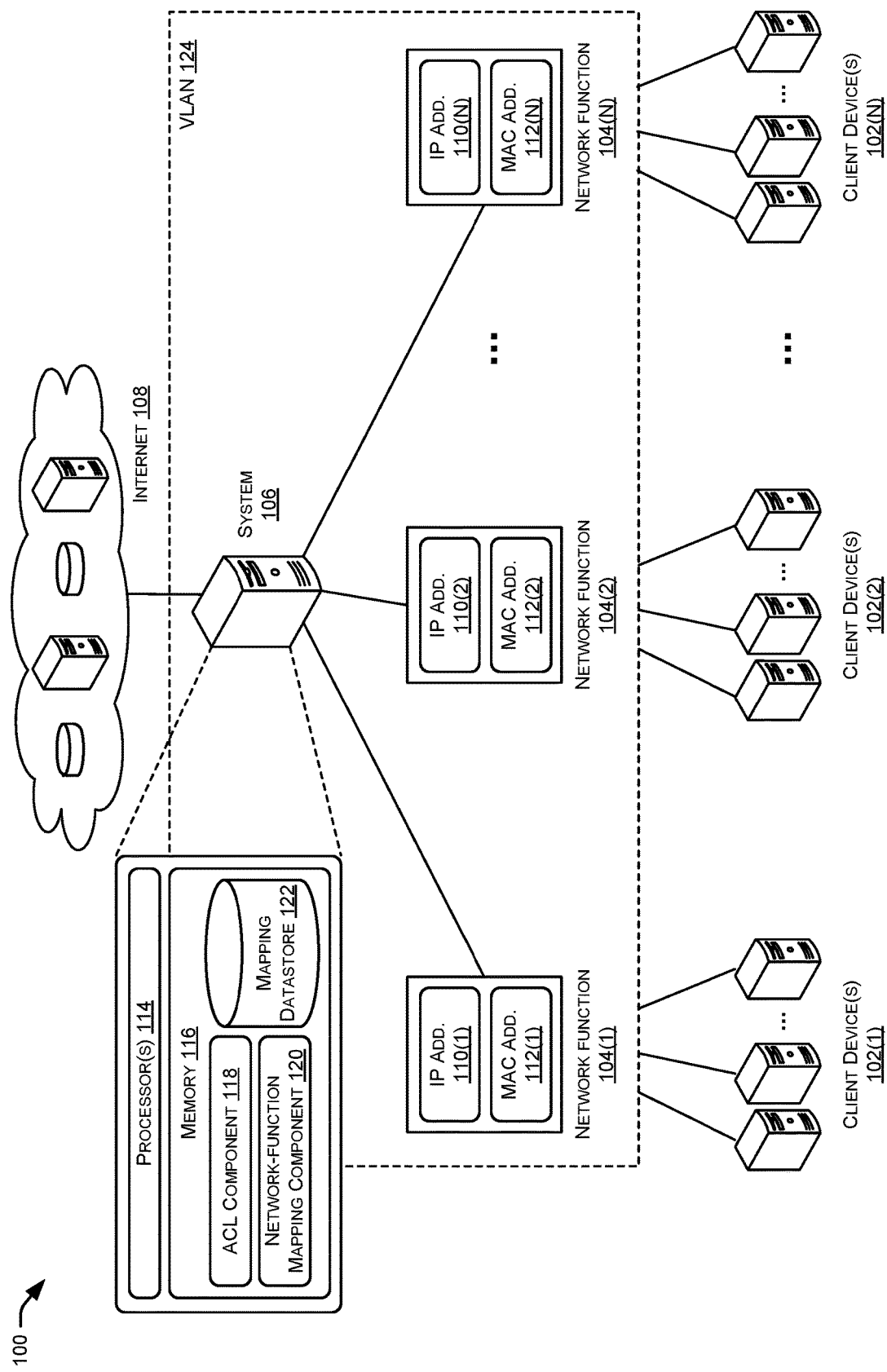
FIG. 1 illustrates a system-architecture diagram of an example environment in which different instances of a common network function (e.g., a virtualized network function (VNF) or a containerized network function (CNF) are deployed for different tenants, represented by respective sets of client computing devices. In addition, the environment includes a system that receives address resolution protocol (ARP) requests from the respective instances and returns a unique media access control (MAC) address of the system to each instance, thus enabling the individual routing of subsequent traffic from these different network-function instances.

This disclosure describes, in part, a method that includes receiving, at a virtual machine (VM), a first address resolution protocol (ARP) request from a first instance of a virtualized network function (VNF), the first instance of the VNF associated with a first media access control (MAC) address. The method also includes determining, by the VM and from the first ARP request, the first MAC address, as well as determining by the VM and based at least in part on the first MAC address, a second MAC address with which to respond to the first ARP request. The method further includes sending, by the VM and to the first instance of the VNF, a response to the first ARP request, the response to the first ARP request specifying the second MAC address. In addition, the method includes receiving, at the VM, a second ARP request from a second instance of the VNF, the second instance of the VNF associated with a third MAC address, as well as determining, by the VM and from the second ARP request, the third MAC address. The method further includes determining, by the VM and based at least in part on the third MAC address, a fourth MAC address with which to respond to the second ARP request, as well as sending, by the VM and to the second instance of the VNF, a response to the second ARP request, the response to the second ARP request specifying the fourth MAC address.

This disclosure also describes, in part, a system comprising one or more processors and one or more non-transitory computer-readable media storing computer-executable instructions that, when executed, cause the one or more processors to perform acts that include receiving a first ARP request from a first instance of a network function, the first instance of the network function associated with a first MAC address. The acts may further include determining, based at least in part on the first ARP request, the first MAC address, as well as determining, based at least in part on the first MAC address, a second MAC address with which to respond to the first ARP request. The acts may further include sending, to the first instance of the network function, a response to the first ARP request, the response to the first ARP request specifying the second MAC address. In addition, the acts may include receiving a second ARP request from a second instance of the network function, the second instance of the network function associated with a third MAC address and determining, based at least in part on the second ARP request, the third MAC address. The acts may further include determining, based at least in part on the third MAC address, a fourth MAC address with which to respond to the second ARP request and sending, to the second instance of the network function, a response to the second ARP request, the response to the second ARP request specifying the fourth MAC address.

Additionally, the techniques described herein may be performed via methods, devices, systems, and/or non-transitory computer-readable media storing computer-executable instructions that, when executed by one or more processors, performs the techniques described herein.

Example Embodiments

As described above, in today's world of network function virtualization (NFV), application providers often provide their images in a format that comes from the physical world. That is, each image is generally the same image that runs on a piece of hardware, having only been modified to run as a virtual machine (VM) and enabled via an orchestration platform. However, this results in requirements similar to what the application would require when running on hardware, such as specific interfaces, ordering, and the like. In addition, if an underlying application was written for a single tenant, it may prove difficult to make the application work for multiple tenants. Thus, running a legacy application in a more dynamic environment proves challenging.

The techniques below, however, enable the running of legacy applications as network functions (e.g., virtual network functions (VNFs) or containerized network functions (CNFs)) by providing a system that routes traffic and/or applies policy to traffic from the respective network functions based on which instance of the network function sends the traffic. For example, the system (which comprise a VM or container) may steer traffic at a layer-2 (L2) level from an instance of a network function to the system, may intercept this L2 traffic, and may route subsequent traffic from the instance of the network functions appropriately. That is, the system described below may intercept particular traffic and redirect it elsewhere and/or apply predefined policy to the traffic. By doing so, the system enables legacy applications to be run within VMs and/or containers without modifying of the underlying modifications.

In other words, the described configuration enables legacy applications to run within VMs and/or containers by providing a system that intercepts L2 traffic from these different VMs and/or containers and routing the traffic based on which VM or container sent the traffic. In another example, a legacy application that is otherwise unable to be run in a multi-tenant manner (e.g., due to security policies) may be enabled for multiple tenants by selecting filtering and steering L2 traffic and presenting different layer-3 (L3) endpoints that aggregate such applications into multiplexed trunks and/or apply security based on metadata of the application.

In order to enable these legacy applications to run within a VM and/or container environment, the techniques described below may employ a system (e.g., running as a VM) that associates different respective namespaces and MAC addresses to different instances of a network function. For example, envision that an application provider provides these instances of a virtual network function (VNF), denoted herein as a first VNF, a second VNF, and a third VNF. Envision that the first VNF is associated with a first IP address and a first MAC address, the second VNF is associated with a second IP address and a second MAC address, and the third VNF is associated with a third IP address and a third MAC address. The system may generate a data structure (e.g., a table) that associates the first IP/MAC address(es) with a second namespace and a first MAC address of the system, the second IP/MAC address(es) with a first namespace and a second MAC address of the system, and the third IP/MAC address(es) with a third namespace and a third MAC address of the system. That is, the system may generate a data structure causes traffic received from the first MAC address (associated with the first VNF) to be routed to the first namespace and the first MAC address of the system, traffic received from the second MAC address (associated with the second VNF) to be routed to the second namespace and the second MAC address of the system, and so forth.

In addition to generating the data structure, the system may employ an access control list (ACL) indicating which traffic to allow through and which traffic to disregard. In the above example, the system may configure the ACL to allow through traffic from the first MAC address of the first VNF, the second MAC address of the second VNF, and the third MAC address of third VNF, while dropping traffic from other MAC addresses. After the system has been so configured, the system may respond to ARP requests from the first, second, and third VNFs, with these responses indicating the appropriate MAC address of the system to which the respective VNF should send subsequent traffic.

For example, after the system generates the data structure and the ACL described above, envision that the first VNF sends a first ARP request, which the system intercepts. Upon receiving the first ARP request, the system may identify, from the ARP request, the first MAC address associated with the first VNF. Further, the system may use this first MAC address to determine, from the generated data structure (e.g., the table), which MAC address of the system is associated with the first VNF. In this example, the system determines that the first namespace and the first MAC address of the system is associated with the first VNF. Thus, the system may respond to the first ARP request indicating that the first VNF is to send subsequent traffic to the first MAC address of the system. The response may include additional information, such as the IP address of the system, the namespace dedicated to the first VNF, and/or the like.

After receiving this response, the first VNF may now route subsequent traffic to the first MAC address of the system, as indicated in the response. Upon receiving subsequent packets referencing the first MAC address of the system, the system may route these packets to the namespace dedicated to the first VNF. By doing so, the system may apply predefined policy to the packets (which may be different than policy applied to packets from the second or third VNFs), may route the packets to network devices in a manner that is different than a routing associated with packets received from the second and/or third VNFs, or the like.

Similarly, if the second VNF sends a second ARP request, the system may receive this ARP request, allow the traffic through based on the ACL, determine the second MAC address of the system associated with the second VNF, and generate and send a response to the second ARP request indicating the second MAC address of the system. The second VNF may then begin sending subsequent traffic to the second MAC address of the system, which may receive the traffic and apply policy and/or route the traffic in accordance with the configuration of the namespace for the second VNF. For example, metadata may be stored in the second namespace and attached to the packets prior to being sent further down the network.

In addition, if the third VNF sends a third ARP request, the system may receive this third ARP request, allow the traffic through based on the ACL, determine the third MAC address of the system associated with the third VNF, and generate and send a response to the third ARP request indicating the third MAC address of the system. The third VNF may then begin sending subsequent traffic to the third MAC address of the system, which may receive the traffic and apply policy and/or route the traffic in accordance with the configuration of the namespace for the third VNF. Again, metadata may be stored in the third namespace and attached to the packets prior to being sent further down the network. The metadata stored in each namespace may differ from one another based on requirements of the tenant associated with each instance of the VNF. For example, first metadata may be associated with the first namespace and attached to packets originating from the first VNF, second metadata may be associated with the second namespace and attached to packets originating from the first VNF, and so forth.

As will be appreciated, the described techniques thus allow for legacy applications to be run as virtualized and/or containerized network functions in a cloud platform, without changing the underlying application. Instead of requiring that application providers modify their applications to run in a VNF/CNF environment, this work is offloaded to the system introduced above and described below, which routes traffic and/or applies policy to the traffic based on which instance of a VNF/CNF sends the traffic. The system may be configured to work with any number of instances of a VNF/CNF.

FIG. 1 illustrates a system-architecture diagram of an example network 100 that may implement the techniques described herein. As illustrated, the network 100 may comprise an array of computing devices, such as gateways, routers, network bridges, modems, wireless access points, networking cables, line drivers, switches, hubs, protocol converters, servers, firewalls, network address translators, multiplexers, network interface controllers, wireless network interface controllers, terminal adapters, and/or the like. In some examples, the network 100 comprises a data center or cloud-computing network comprising servers and other network components (e.g., routers, switches, etc.) stored across multiple data centers located across geographic areas. In these instances, the cloud-computing environment may be a distributed network through which users (often customers) may interact via user devices to manage or otherwise interact with service provided by the cloud computing network. The cloud computing network may provide on-demand availability of computing system resources, such as data storage, computing power (e.g., CPU, GPU, etc.), networking, databases, etc., without direct active management by users. In some examples, the cloud computing network may be managed and maintained by a service provider such that users do not have to invest in and maintain the computing infrastructure for their computing resource needs. Generally, a user may be provided access to, or allocated use of, a portion of the computing resources in the cloud computing network. The cloud computing network may scale, such as by spinning up resources or spinning down resources, based on demand for the individual users. The portions of the cloud computing network may be allocated using hardware virtualization such that portions of the cloud computing network can be configured and managed by the user (e.g., security configuration, load balancing configuration, etc.). However, the cloud computing network need not be managed by a service provider, and can be managed by any entity, including the user themselves that run the applications or services.

As illustrated, the network 100 may include one or more groups of client computing devices 102(1), 102(2), . . . , and 102(N). Each group of one or computing devices may be associated with a single tenant or entity (e.g., an organization, individual, etc.). Also, as illustrated, each tenant may employ a respective network function 104(1), 104(2), . . . , 104(N), which may represent a virtual network function (VNF), a containerized network function (CNF), or the like. For example, a tenant associated with the first group of computing devices 102(1) may be associated with, and utilize, the first network function 104(1), the second group of client devices 102(2) may be associated with, and utilize, the second network function 104(2), and the $n^{th}$ group of client devices 102(N) may be associated with, and utilize, the network function 104(N).

Each network function 104(1)-(N) may represent an instance of a common application residing within a VM or a container. That is, each network function may represent a legacy application originally written for execution on physical hardware, but now running on respective VMs and/or containers in the cloud (e.g., networked environment). As introduced above and described in detail below, the network 100 may further include a system 106 configured to intercept and route traffic from these network functions, thus allowing the legacy application to run as VMs and/or within containers. That is, the system 106 may act as a default gateway for these network functions 104(1)-(N) and may apply policy and route received traffic towards the Internet 108 based the identity of the instance of the network function sending the traffic.

As illustrated, each network function is associated with an Internet Protocol (IP) address and a MAC address. For example, the first network function 104(1) is associated with an IP address 110(1) and a MAC address 112(1), the second network function 104(2) is associated with an IP address 110(2) and a MAC address 112(2), and the $n^{th}$ network function 104(N) is associated with an IP address 110(N) and a MAC address 112(N). The system 106, meanwhile, may comprise one or more processors 114 and memory 116, which may store an ACL component 118, a network-function mapping component 120, and a mapping datastore 122. In some instances, some or all of the functionality of the system 106 may run as a VM.

The ACL component 118 may generate and store an access control list indicating which packets are allowed through in the system 106 based on an identifier (e.g., a MAC address) associated with a device that sends the traffic. In this example, the ACL may indicate that traffic from the different instances of the network function 104(1)-(N) are allowed through. In addition, the network-function mapping component 120 may determine and associate different respective namespaces of the system 106 with different instances of the network functions 104(1)-(N). For example, a first namespace, IP address, and MAC address of the system 106 may be associated with the first network function 104(1), a second namespace, IP address, and MAC address of the system 106 may be associated with the second network function 104(2), and so forth. These associations may be stored as a data structure (e.g., a table) in the mapping datastore 122. Given this configuration, the system 106 may be configured to respond to ARP requests from the different network functions 104(1)-(N), indicating which namespaces, IP address, and/or MAC address of the system 106 each respective network function is to address for subsequent packets.

Within the network 100 and after the system 106 has been configured as described immediately above, an operator of one of the client computing devices may interact with an instance of the network function. For example, a first operator associated with the first tenant may use a device of the client devices 102(1) to interact with the first network function 104(1), a second operator associated with the second tenant may use a device of the client devices 102(2) to interact with the second network function 104(2), and so forth. Upon the first operator invoking the first network function 104(1), the first network function may broadcast a first ARP request within a virtual local area network (VLAN) 124, such that multiple devices including the system 106 receives the first ARP request requesting information for the next hop in the network for the first network function 104(1). Upon receiving the first ARP request, the ACL component 118 may determine, based on the MAC address 112(1) of the first network function 104(1), to allow the ARP request through. Thereafter, the network-function mapping component 120 may access the mapping datastore 122 to determine, from the data structure (e.g., the table) and using the MAC address 112(1), the namespace, IP address, and/or MAC address of the system 106 that is associated with the MAC address 112(1) (and, hence, associated with the first network function 104(1)). The system may then generate a response to the first ARP request indicating that the first network function 104(1) is to send subsequent network traffic to the determined MAC address of the system 106 that has been assigned to the MAC address 112(1) of the network function 104(1).

Upon receiving this response, the network function 104(1) may send subsequent traffic to the MAC address indicated by the response. Upon the system receiving the subsequent packet from the network function 104(1), the ACL component 118 may again allow through the traffic based on the MAC address 112(1) indicated by the packet. Furthermore, the network-function mapping component 120 may determine, based on the MAC address of the system 106 specified in the packet, to route the packet to the namespace that has been assigned to the first network function 104(1). At the point, the system may apply predefined policy to the packet, may append predefined metadata to the packet, and/or may route the traffic according to a desired policy/configuration of the tenant utilizing the first network function 104(1). That is, the tenant associated with the group of computing devices 102(1) and the first network function 104(1) may have provided the policy information, metadata information, and/or routing information to the system, which may execute the policies, append the metadata, and/or route the traffic as indicated. By executing functionality at the system 106, the underlying legacy application of the network functions 104(1)-(N) is able to run in cloud environment across different tenants, which may potentially have different policies, routings, and/or the like.

For example, envision that a second operator associated with the second tenant uses a device of the client devices 102(2) to interact with the second network function 104(2). Upon the second operator invoking the second network function 104(2), the second network function may broadcast a second ARP request within the VLAN 124, such that multiple devices including the system 106 receives the second ARP request requesting information for the next hop in the network for the first network function 104(1). Upon receiving the second ARP request, the ACL component 118 may determine, based on the MAC address 112(2) of the second network function 104(2), to allow the second ARP request through. Thereafter, the network-function mapping component 120 may access the mapping datastore 122 to determine, from the data structure (e.g., the table) and using the MAC address 112(2), the namespace, IP address, and/or MAC address of the system 106 that is associated with the MAC address 112(2) (and, hence, associated with the second network function 104(2)). The system 106 may then generate a response to the second ARP request indicating that the first network function 104(2) is to send subsequent network traffic to the determined MAC address of the system 106 that has been assigned to the MAC address 112(2) of the network function 104(2).

Upon receiving this response, the second network function 104(2) may send subsequent traffic to the MAC address indicated by the response. Upon the system 106 receiving the subsequent packet from the second network function 104(2), the ACL component 118 may again allow through the traffic based on the MAC address 112(2) indicated by the packet. Furthermore, the network-function mapping component 120 may determine, based on the MAC address of the system 106 specified in the packet, to route the packet to the namespace that has been assigned to the second network function 104(2). At the point, the system 106 may apply predefined policy to the packet, may append predefined metadata to the packet, and/or may route the traffic according to a desired policy/configuration of the tenant utilizing the second network function 104(2). Again, the tenant associated with the second group of computing devices 102(2) and the second network function 104(2) may have provided the policy information, metadata information, and/or routing information to the system, which may execute the policies, append the metadata, and/or route the traffic as indicated. It is noted that the policies implemented by the system 106 on behalf of the second tenant may differ by the policies implemented by the system 106 on behalf of the first tenant, the $n^{th}$ tenant, and so forth.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 3, 4A-B, and 5A-C, and as described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

Figure 2:
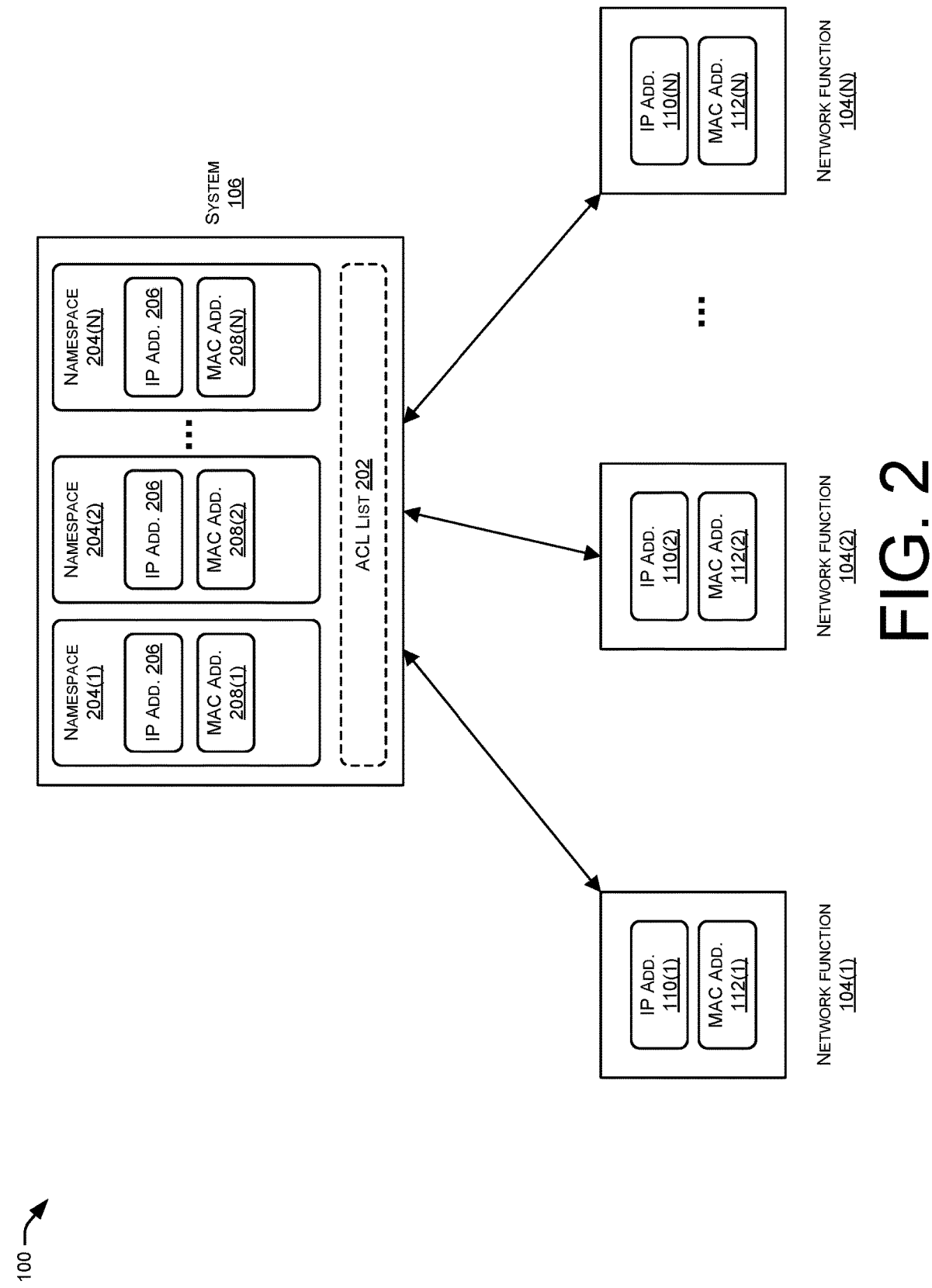
FIG. 2 illustrates example details of the system of FIG. 1. As illustrated, the system may associate respective namespaces and MAC addresses with different ones of the instances of the network function.

FIG. 2 illustrates example details of the system 106 of FIG. 1. As illustrated, the system 106 may store an access control list (ACL) 202, which the ACL component 118 may generate for determining which traffic to let through and which to drop. For example, the ACL list 202 may indicate that traffic from the MAC addresses 112(1)-(N) is to be let through, while other traffic is to be dropped.

In addition, the system 106 includes multiple namespaces 204(1), 204(1), . . . , 204(N), each of which may be assigned to a respective instance of a network function. For example, the network-function mapping component 120 may associate the first namespace 204(1) with the first network function 104(1), the second namespace 204(2) with the second network function 104(2), and the $n^{th}$ namespace 204(N) with the $n^{th}$ network function 104(N). As illustrated, each namespace 204(1)-(N) may be associated with the IP address of the system 106, as well as with a unique MAC address 208(1), 208(2), . . . , 208(N) of the respective namespace 204(1)-(N). In some instances, the network-function mapping component 120 may associate, in the mapping datastore 122, the first MAC address 112(1) with the first MAC address 208(1), the second MAC address 208(2) with the second MAC address 112(2), and the $n^{th}$ MAC address 208(N) with the $n^{th}$ MAC address 112(N).

Therefore, upon one of the network functions broadcasting an ARP request, the network-function mapping component 120 may analyze the ARP request to determine the MAC address associated with the network function. The network-function mapping component 120 may then use this underlying MAC address to determine which MAC address of the system is associated with the network function. Upon making this determination, the network-function mapping component 120 sends a response to the ARP request, with this response indicating the appropriate MAC address of the system 106. For example, if the first network function 112(1) sends an ARP request, the network-function mapping component 120 may analyze the ARP request to identify the MAC address 112(1). The network-function mapping component 120 may then determine, from the data structure in the mapping datastore 122, that the namespace 204(1) and/or the MAC address of the namespace 208(1) is associated with the MAC address 112(1) (and, hence, with the network function). The network-function mapping component 120 may then generate a reply to the ARP request, indicating the MAC address 208(1) (and/or additional information). The first network function 104(1) may then address subsequent network traffic to the MAC address 208(1) (and may also specify the IP address 206) associated with the first namespace 204(1). As noted above, the system 106 may append metadata that has been associated with the first namespace 204(1), apply security policy that has been associated with the first namespace 204(1), route traffic in a manner that has been associated with the first namespace 204(1), and/or the like.

FIG. 3 illustrates an example flow of operations 300 for receiving an ARP request from a first instance of the illustrated network function, determining a MAC address of the system previously associated with this instance, returning an indication of this MAC address to the instance of the network function, and subsequent routing traffic and/or applying policy to packets sent to this MAC address. It is to be appreciated that while the flow of operations 300 is illustrated for a single network function, it is equally applicable to any other number of network-function instances.

At a first operation ("1"), the system 106 may associate respective MAC addresses of network functions (e.g., VNFs/CNFs) with respective MAC addresses of the system 106. For example, the network-function mapping component 120 may store, in the mapping datastore 122, an indication that the first MAC address 208(1) of the system is associated with the first network function 104(1), the second MAC address 208(2) of the system is associated with the second network function 104(2), and the $n^{th}$ MAC address 208(N) of the system is associated with the $n^{th}$ network function 104(N).

At a second operation ("2"), the first network function 104(1) may receive a request from the client device, such as from a device of the group of client devices 102(1). At a third operation ("3") and in response, the first network component 104(1) may broadcast an ARP request within the illustrated network. At a fourth operation ("4"), the system may receive and determine to response to the broadcasted ARP request. For example, the ACL list 202 may allow through the ARP request, given that the MAC address 112(1) indicated in the ARP request has been indicated as associated with allowable traffic in the ACL list.

At a fifth operation ("5"), the system may determine, based on the MAC address 112(1) in the ARP request, a MAC address of the system 106 that has been associated with the first MAC address 112(1) and/or the first network function 104(1). In this example, the network-function mapping component 120 may determine that the MAC address 208(1) of the namespace 204(1) of the system 106 has been associated with the first MAC address 112(1) and/or the first network function 104(1). At a sixth operation ("6"), the system 106 may send a response to the ARP request indicating the MAC address 208(1) to the network function 104(1).

At a seventh operation ("7"), the network function 104(1) receives the response to the ARP request that indicates that subsequent traffic is to be sent to the MAC address 208(1). At an eight operation ("8"), the network function 104(1) sends one or more subsequent packets to the MAC address 208(1), which the system receives at a ninth ("9") operation. Also illustrated as part of the ninth operation, the system 106 may apply policy and/or route the packet(s) according to a configuration associated with the namespace 204(1). That is, the tenant associated with and utilize the first network function 104(1) may have previously provided an indication of policy to apply to traffic from the first network function 104(1) and/or an indication of how the traffic is to be routed upon exit of the namespace 204(1) of the system 106. The system 106 may apply this policy and/or route the traffic accordingly. Further, it is to be appreciated that this policy and/or routing instructions provided by the first tenant and associated with the first namespace 204(1) may be different than the policy and/or routing instructions provided by the second tenant and associated with the second namespace 204(2), and so forth.

Figure 4A:
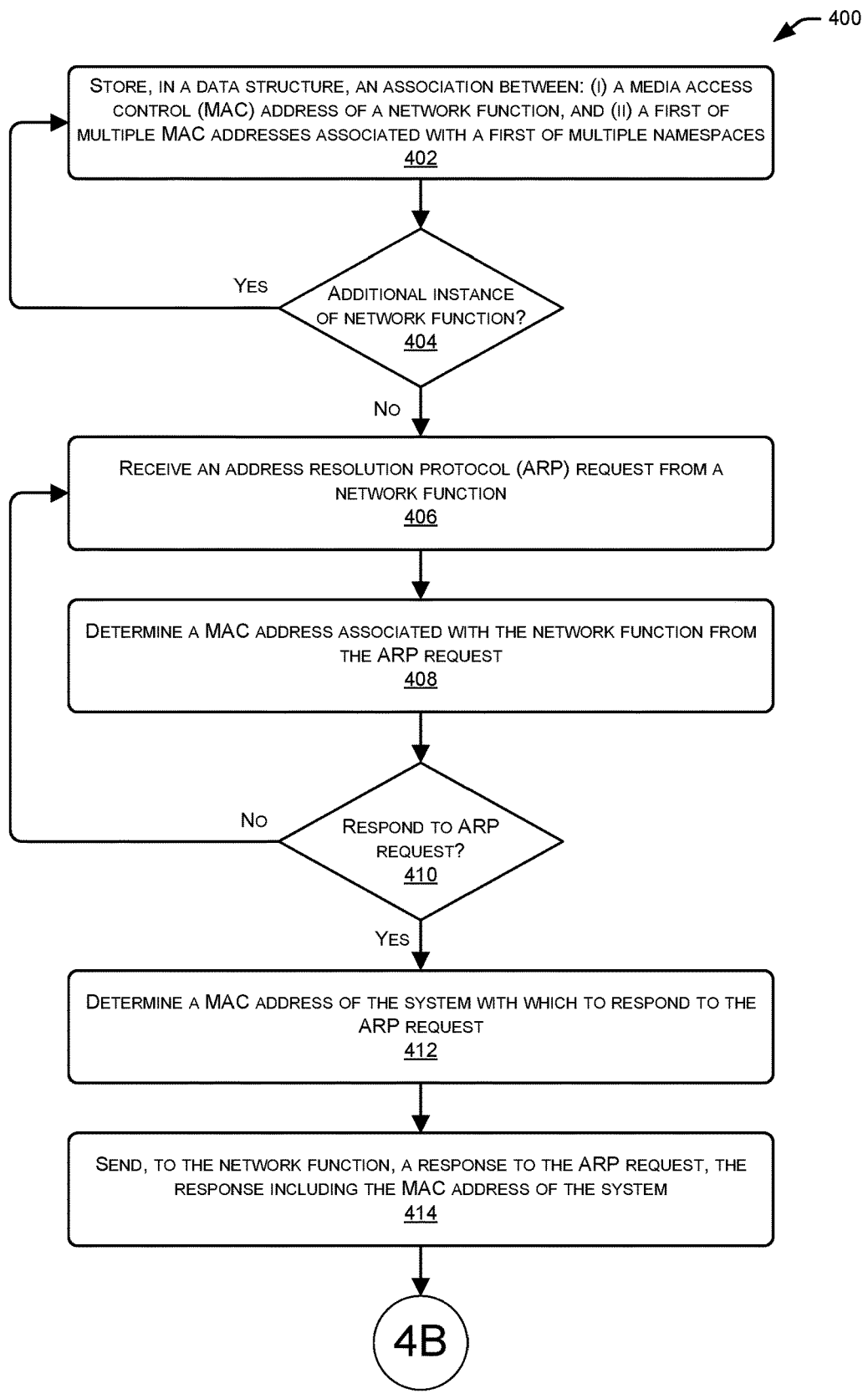
FIGS. 4A-B collectively illustrate a flow diagram of an example process for configuring the system from FIG. 1 to route traffic and/or apply policy from different instances of network functions.
Figure 4B:
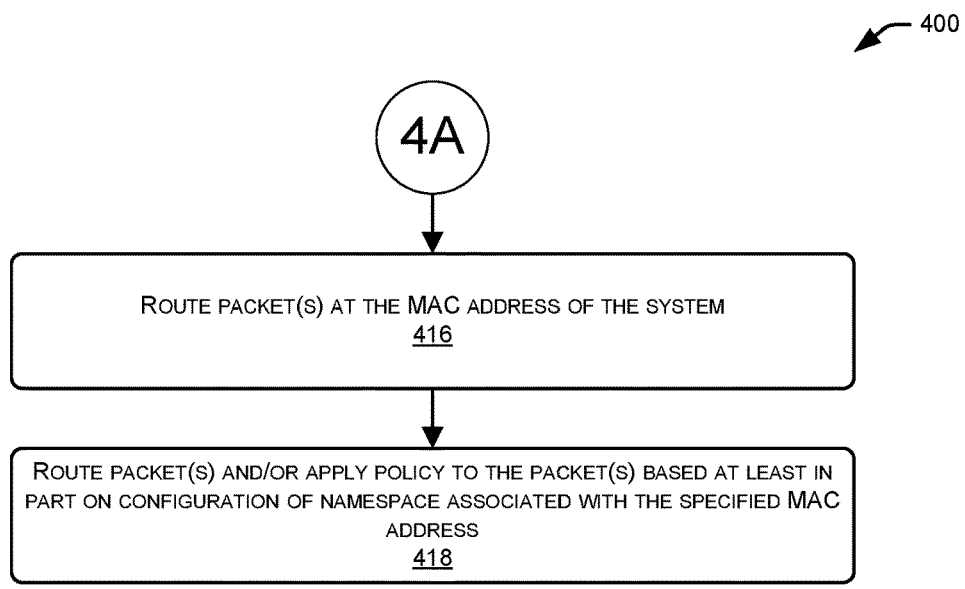

FIGS. 4A-B collectively illustrate a flow diagram of an example process 400 for configuring the system 106 to route traffic and/or apply policy from different instances of network functions. In some instances, the system 106 described above may perform some or all of the operations of the process 400. Of course, while the operations are described below with reference to the system 106, it is to be appreciated that other systems, devices, and/or the like may perform some or all of these operations in other instances.

At an operation 402, the system 106 may store, in a data structure, an association between: (i) a MAC address of a network function (e.g., a VNF, a CNF, etc.), and (ii) a first MAC address of multiple MAC addresses associated with a first namespace of multiple namespaces of the system 106. At an operation 404, the system 106 determines whether it is to be configured for another instance of the network function, such as another VNF, CNF, or the like. If so, then the process 400 returns to the operation 402 for generating the indicated association for the additional instance. If not, however, then the process 400 proceeds to an operation 406, at which point the system 106 may receive an ARP request from an instance of a network function.

At an operation 408, the system 106 determines a MAC address associated with the network function from the ARP request and, at an operation 410, determines whether to respond to the ARP request. For example, the ACL component 118 may drop the ARP request if the MAC address associated with the sender of the ARP request is not indicated in the ACL list 202. Thus, if the system 106 determines not to respond to the APR request, then the process 400 returns to the operation 406, representing the system 106 receiving another ARP request at a later point in time. If, however, the system 106 determines to respond to the ARP request, then at an operation 412 the system 106 may determine a MAC address of the system 106 with which to respond to the ARP request. For example, the network-function mapping component 120 may access the mapping datastore 122 to determine which MAC address/namespace of the system 106 has been associated with the MAC addressed determined at the operation 408. At an operation 414, the system 106 sends, to the network function, a response to the ARP request, with the response including the MAC address of the system 106 determined at the operation 412.

FIG. 4B continues the illustration of the process 400 and includes, at an operation 416, receiving one or more packets at the MAC address of the system 106 determined at the operation 412 and specified in the response to the ARP request. At an operation 418, the system 106 may route the packet(s) and/or apply policy to the packet(s) based at least in part on a configuration of the namespace associated with the specified MAC address. As described above, an administrator of a tenant associated with the network function may have previously provided this policy and/or routing information for execution by the system, thus offloading these requirements from the instance of the network function executing in the VM or container and to the system 106.

Figure 5A:
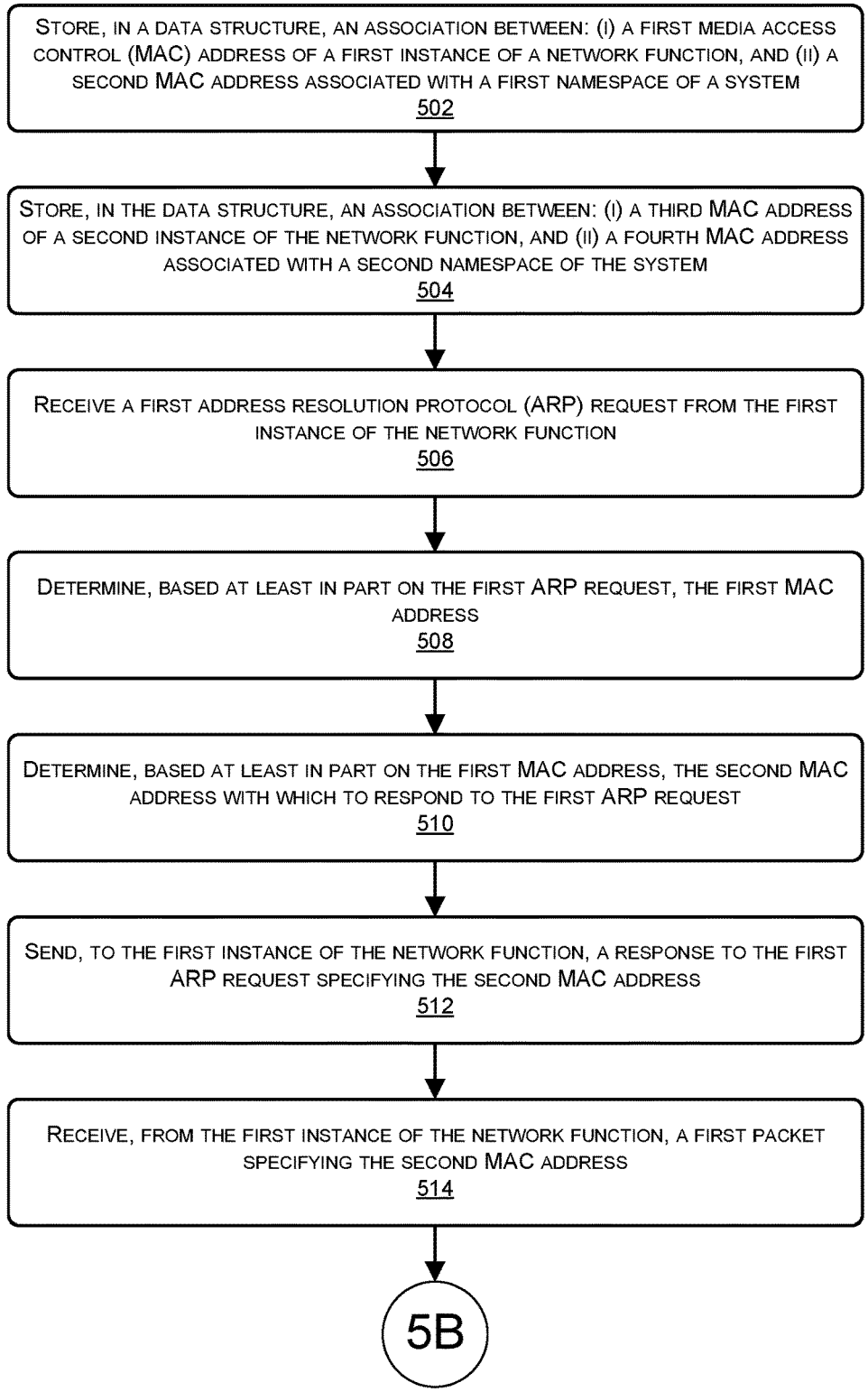
FIGS. 5A-C collectively illustrate a flow diagram of another example process for configuring the system from FIG. 1 to route traffic and/or apply policy from different instances of network functions.
Figure 5B:
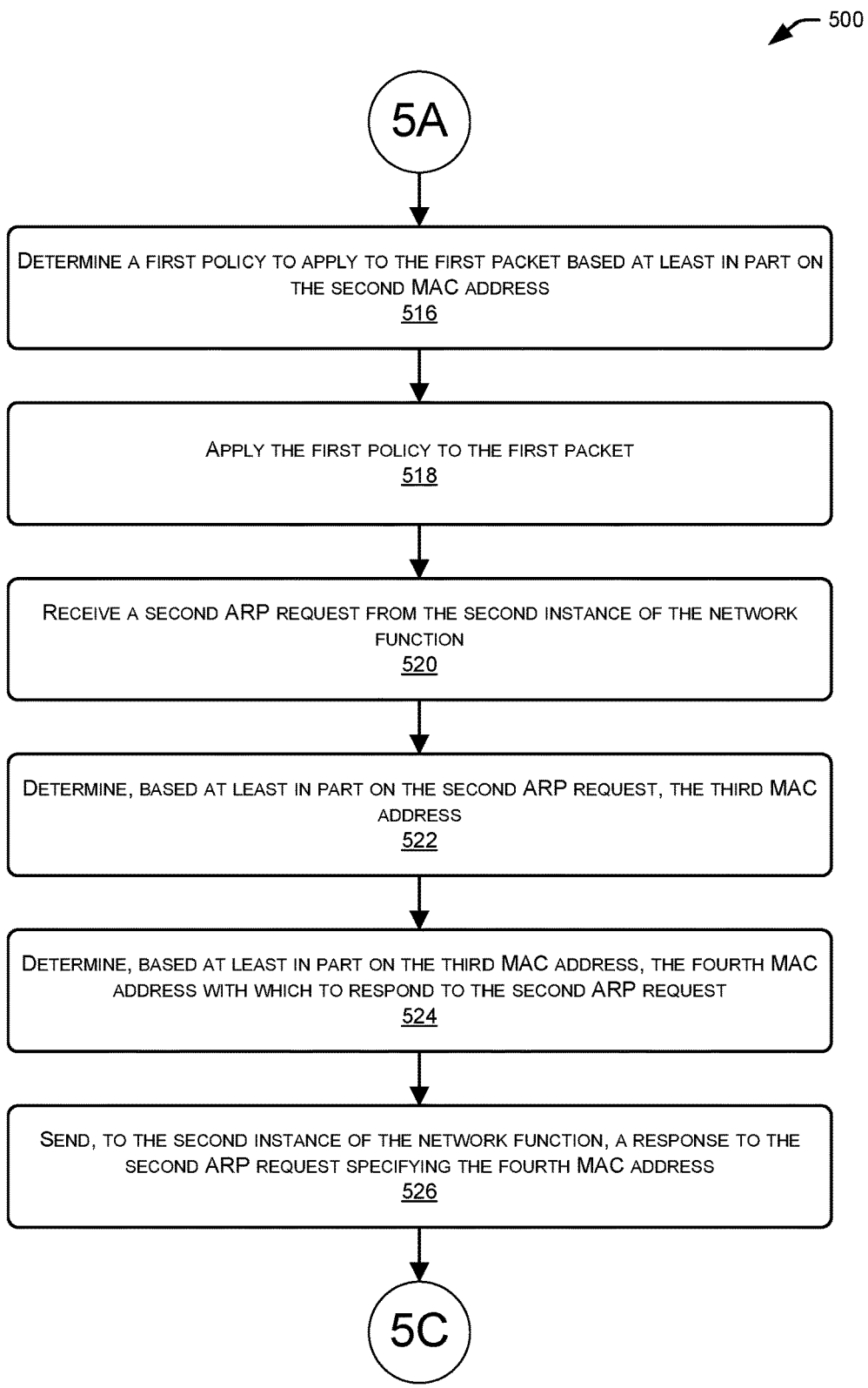
Figure 5C:
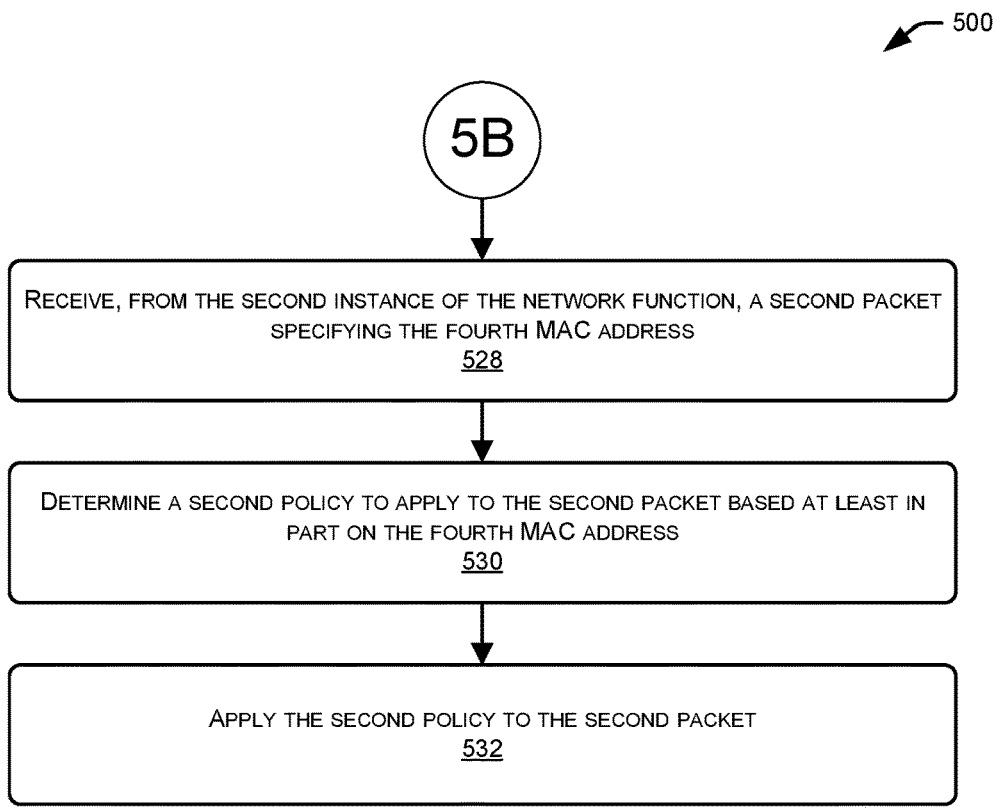

FIGS. 5A-C collectively illustrate a flow diagram of another example process 500 for configuring the system 106 to route traffic and/or apply policy from different instances of network functions. Again, the system 106 described above may perform some or all of the operations of the process 500 and/or other systems, devices, and/or the like may perform some or all of these operations.

At an operation 502, the system 106 may store, in a data structure of the system, an association between: (i) a first MAC address associated with a first instance of a network function, and (ii) a second MAC address associated with a first namespace of the system. At an operation 504, the system 106 may store, in the data structure of the system, an association between: (i) a third MAC address associated with a second instance of the network function, and (ii) a fourth MAC address associated with a second namespace of the system.

At an operation 506, the system 106 may receive a first ARP request from the first instance of the network function associated with the first MAC address. At an operation 508, the system 106 may determine, based at least in part on the first ARP request, the first MAC address and, at an operation 510 may determine, based at least in part on the first MAC address, the second MAC address with which to respond to the first ARP request. At an operation 512, the system may send, to the first instance of the network function, a response to the first ARP request, the response to the first ARP request specifying the second MAC address. Sometime thereafter, at an operation 514, the system 106 may receive, from the first instance of the network function, a first packet specifying the second MAC address.

FIG. 5B continues the illustration of the process 500 and includes, at an operation 516, the system 106 determining a first policy to apply to the first packet based at least in part on the second MAC address. At an operation 518, the system 106 may apply the first policy to the first packet.

At an operation 520, meanwhile, the system 106 may receive a second ARP request from the second instance of the network function associated with the third MAC address. At an operation 522, the system 106 may determine, based at least in part on the second ARP request, the third MAC address and, at an operation 524 may determine, based at least in part on the third MAC address, the fourth MAC address with which to respond to the second ARP request. At an operation 526, the system 106 may send, to the second instance of the network function, a response to the second ARP request, the response to the second ARP request specifying the fourth MAC address.

FIG. 5C continues the illustration of the process 500 and includes, at an operation 528, receiving, from the second instance of the network function, a second packet specifying the fourth MAC address. At an operation 530, the system 106 may determine a second policy to apply to the second packet based at least in part on the fourth MAC address, the second policy differing from the first policy, and, at an operation 532, may apply the second policy to the second packet.

Figure 6:
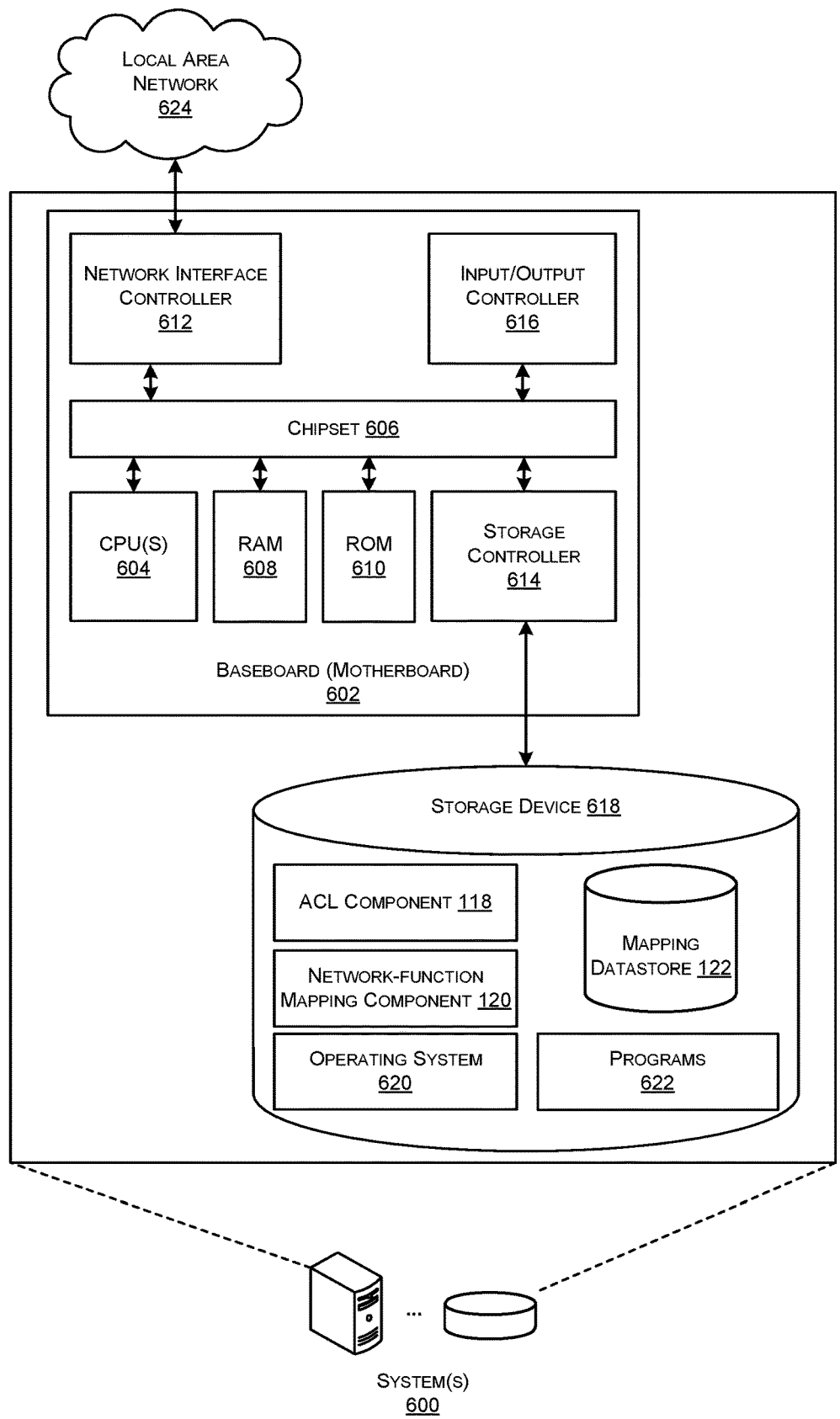
FIG. 6 is a computer architecture diagram showing an illustrative computer hardware architecture for implementing computing devices configured to implement the techniques described herein.

FIG. 6 is a computer architecture diagram showing an illustrative computer hardware architecture for implementing a system 600 that can be utilized to implement aspects of the various technologies presented herein. The system 106, discussed above, may include some or all of the components discussed below with reference to the system 600.

As mentioned above, the computing resources provided by a cloud computing network, data center, or the like can be data processing resources such as VM instances or hardware computing systems, database clusters, computing clusters, storage clusters, data storage resources, database resources, networking resources, and others. Some of the systems 600 can also be configured to execute a resource manager capable of instantiating and/or managing the computing resources. In the case of VM instances, for example, the resource manager can be a hypervisor or another type of program configured to enable the execution of multiple VM instances on a single server system 600. Systems 600 in a data center can also be configured to provide network services and other types of services.

The system 600 includes a baseboard 602, or "motherboard," which is a printed circuit board to which a multitude of components or devices can be connected by way of a system bus or other electrical communication paths. In one illustrative configuration, one or more central processing units (CPUs) 604 operate in conjunction with a chipset 606. The CPUs 604 can be standard programmable processors that perform arithmetic and logical operations necessary for the operation of the system 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the system 600. The chipset 606 can further provide an interface to a computer-readable storage medium such as a read-only memory (ROM) 510 or non-volatile RAM (NVRAM) for storing basic routines that help to startup the system 600 and to transfer information between the various components and devices. The ROM 610 or NVRAM can also store other software components necessary for the operation of the system 600 in accordance with the configurations described herein.

The system 600 can operate in a networked environment using logical connections to remote computing devices and computer systems through a network, such as a local area network 624. The chipset 606 can include functionality for providing network connectivity through a Network Interface Card (NIC) 612, such as a gigabit Ethernet adapter. The NIC 612 is capable of connecting the system 600 to other computing devices over the network. It should be appreciated that multiple NICs 612 can be present in the system 600, connecting the computer to other types of networks and remote computer systems.

The system 600 can be connected to a storage device 618 that provides non-volatile storage for the computer. The storage device 618 can store an operating system 620, programs 622, and data, which have been described in greater detail herein. The storage device 618 can be connected to the system 600 through a storage controller 614 connected to the chipset 606. The storage device 618 can consist of one or more physical storage units. The storage controller 614 can interface with the physical storage units through a serial attached SCSI (SAS) interface, a serial advanced technology attachment (SATA) interface, an FC interface, or other type of interface for physically connecting and transferring data between computers and physical storage units.

The system 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the system 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The system 600 can further read information from the storage device 618 by detecting the physical states or characteristics of one or more particular locations within the physical storage units.

In addition to the mass storage device 618 described above, the system 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the system 600.

By way of example, and not limitation, computer-readable storage media can include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the system 600. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 618 can store other system or application programs and data utilized by the system 600.

In one embodiment, the storage device 618 or other computer-readable storage media is encoded with computer-executable instructions which, when loaded into the system 600, transform the computer from a general-purpose computing system into a special-purpose computer capable of implementing the embodiments described herein. These computer-executable instructions transform the system 600 by specifying how the CPUs 604 transition between states, as described above. According to one embodiment, the system 600 has access to computer-readable storage media storing computer-executable instructions which, when executed by the system 600, perform the various processes described above with regard to FIGS. 2A-3D. The system 600 can also include computer-readable storage media having instructions stored thereupon for performing any of the other computer-implemented operations described herein.

The system 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the system 600 might not include all of the components shown in FIG. 6, can include other components that are not explicitly shown in FIG. 6, or might utilize an architecture completely different than that shown in FIG. 6.

The system 600 may also store, in the storage device 618, ACL component 118, the network-function mapping component 120, and/or the mapping datastore 122 for performing some or all of the techniques described above with reference to FIGS. 1-5C.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A method comprising:
storing, in a data structure of a virtual machine (VM), an association between: (i) a first media access control (MAC) address associated with a first instance of a virtualized network function (VNF), and (ii) a second MAC address associated with a first namespace of the VM;
storing, in the data structure of the VM, an association between: (i) a third MAC address associated with a second instance of the VNF, and (ii) a fourth MAC address associated with a second namespace of the VM;
receiving, at the VM, a first address resolution protocol (ARP) request from the first instance of the VNF;
determining, by the VM and from the first ARP request, the first MAC address;
determining, by the VM and from the data structure, that the first MAC address is associated with the second MAC address;
sending, by the VM and to the first instance of the VNF, a response to the first ARP request, the response to the first ARP request specifying the second MAC address;
receiving, at the VM, a second ARP request from the second instance of the VNF;
determining, by the VM and from the second ARP request, the third MAC address;
determining, by the VM and from the data structure, that the third MAC address is associated with the fourth MAC address; and
sending, by the VM and to the second instance of the VNF, a response to the second ARP request, the response to the second ARP request specifying the fourth MAC address.

2. The method as recited in claim 1, further comprising:
receiving, at the VM and from the first instance of the VNF, a packet specifying the second MAC address;
determining a policy to apply to the packet based at least in part on the second MAC address; and
applying the policy to the packet.

3. The method as recited in claim 1, further comprising:
receiving, at the VM and from the first instance of the VNF, a first packet specifying the second MAC address;
determining a first policy to apply to the first packet based at least in part on the second MAC address;
applying the first policy to the first packet;
receiving, at the VM and from the second instance of the VNF, a second packet specifying the fourth MAC address;
determining a second policy to apply to the second packet based at least in part on the fourth MAC address, the second policy differing from the first policy; and
applying the second policy to the second packet.

4. The method as recited in claim 1, wherein:
the determining the second MAC address with which to respond to the first ARP request comprises accessing the data structure to identify the association between the first MAC address associated with the first instance of the VNF and the second MAC address; and
the determining the fourth MAC address with which to respond to the second ARP request comprises accessing the data structure to identify the association between the third MAC address associated with the second instance of the VNF and the fourth MAC address.

5. A system comprising:
one or more processors; and
one or more non-transitory computer-readable media storing computer-executable instructions that, when executed, cause the one or more processors to perform acts comprising:
storing, in a data structure of the system, an association between: (i) a first media access control (MAC) address associated with a first instance of a network function, and (ii) a second MAC address associated with a first namespace of the system; and
storing, in the data structure of the system, an association between: (i) a third MAC address associated with a second instance of the network function, and (ii) a fourth MAC address associated with a second namespace of the system;
receiving a first address resolution protocol (ARP) request from the first instance of the network function;
determining, based at least in part on the first ARP request, the first MAC address;
determining, from the data structure, that the first MAC address is associated with the second MAC address;
sending, to the first instance of the network function, a response to the first ARP request, the response to the first ARP request specifying the second MAC address;
receiving a second ARP request from the second instance of the network function;
determining, based at least in part on the second ARP request, the third MAC address;
determining, from the data structure, that the third MAC address is associated with the fourth MAC address; and
sending, to the second instance of the network function, a response to the second ARP request, the response to the second ARP request specifying the fourth MAC address.

6. The system as recited in claim 5, wherein the network function comprises a virtualized network function (VNF) or a containerized network function (CNF).

7. The system as recited in claim 5, the acts further comprising:
receiving, from the first instance of the network function, a packet specifying the second MAC address;
determining a policy to apply to the packet based at least in part on the second MAC address; and
applying the policy to the packet.

8. The system as recited in claim 5, the acts further comprising:
receiving, from the first instance of the network function, a first packet specifying the second MAC address;
determining a first policy to apply to the first packet based at least in part on the second MAC address;
applying the first policy to the first packet;
receiving, from the second instance of the network function, a second packet specifying the fourth MAC address;
determining a second policy to apply to the second packet based at least in part on the fourth MAC address, the second policy differing from the first policy; and
applying the second policy to the second packet.

9. The system as recited in claim 5, wherein:
the determining the second MAC address with which to respond to the first ARP request comprises accessing the data structure to identify the association between the first MAC address associated with the first instance of the network function and the second MAC address; and the determining the fourth MAC address with which to respond to the second ARP request comprises accessing the data structure to identify the association between the third MAC address associated with the second instance of the network function and the fourth MAC address.

10. A method comprising:
storing, in a data structure, an association between: (i) a first media access control (MAC) address associated with a first instance of a network function, and (ii) a second MAC address associated with a first namespace; and
storing, in the data structure, an association between: (i) a third MAC address associated with a second instance of the network function, and (ii) a fourth MAC address associated with a second namespace;
receiving a first address resolution protocol (ARP) request from the first instance of the network function;
determining, based at least in part on the first ARP request, the first MAC address;
determining, from the data structure, that the first MAC address is associated with the second MAC address;
sending, to the first instance of the network function, a response to the first ARP request, the response to the first ARP request specifying the second MAC address;
receiving a second ARP request from the second instance of the network function;
determining, based at least in part on the second ARP request, the third MAC address;
determining, from the data structure, that the third MAC address is associated with the fourth MAC address; and
sending, to the second instance of the network function, a response to the second ARP request, the response to the second ARP request specifying the fourth MAC address.

11. The method as recited in claim 10, wherein the network function comprises a virtualized network function (VNF) or a containerized network function (CNF).

12. The method as recited in claim 10, further comprising:
receiving, from the first instance of the network function, a packet specifying the second MAC address;
determining a policy to apply to the packet based at least in part on the second MAC address; and
applying the policy to the packet.

13. The method as recited in claim 10, further comprising:
receiving, from the first instance of the network function, a first packet specifying the second MAC address;
determining a first policy to apply to the first packet based at least in part on the second MAC address;
applying the first policy to the first packet;
receiving, from the second instance of the network function, a second packet specifying the fourth MAC address;
determining a second policy to apply to the second packet based at least in part on the fourth MAC address, the second policy differing from the first policy; and
applying the second policy to the second packet.

14. The method as recited in claim 10, wherein:
the determining the second MAC address with which to respond to the first ARP request comprises accessing the data structure to identify the association between the first MAC address associated with the first instance of the network function and the second MAC address; and
the determining the fourth MAC address with which to respond to the second ARP request comprises accessing the data structure to identify the association between the third MAC address associated with the second instance of the network function and the fourth MAC address.

* * * * *